US010268581B2

(12) United States Patent
Filippo et al.

(10) Patent No.: US 10,268,581 B2
(45) Date of Patent: Apr. 23, 2019

(54) CACHE HIERARCHY MANAGEMENT

(71) Applicant: ARM Limited, Cambridge (GB)

(72) Inventors: Michael Filippo, Driftwood, TX (US); Klas Magnus Bruce, Leander, TX (US); Vasu Kudaravalli, Austin, TX (US); Adam George, Austin, TX (US); Muhammad Umar Farooq, Austin, TX (US); Joseph Michael Pusdesris, Austin, TX (US)

(73) Assignee: ARM Limited, Cambridge (GB)

( * ) Notice: Subject to any disclaimer, the term of this patent is extended or adjusted under 35 U.S.C. 154(b) by 66 days.

(21) Appl. No.: 15/479,348

(22) Filed: Apr. 5, 2017

(65) Prior Publication Data

US 2018/0293166 A1    Oct. 11, 2018

(51) Int. Cl.
*G06F 11/10* (2006.01)
*G06F 12/0811* (2016.01)
*G06F 12/0815* (2016.01)
*G06F 12/0875* (2016.01)
*G06F 12/0891* (2016.01)

(52) U.S. Cl.
CPC ...... *G06F 12/0811* (2013.01); *G06F 11/1064* (2013.01); *G06F 12/0815* (2013.01); *G06F 12/0875* (2013.01); *G06F 12/0891* (2013.01); *G06F 2212/452* (2013.01); *G06F 2212/62* (2013.01)

(58) Field of Classification Search
None
See application file for complete search history.

(56) References Cited

U.S. PATENT DOCUMENTS

2002/0199151 A1\* 12/2002 Zuraski, Jr. ......... G06F 9/30152
714/763
2013/0042068 A1\* 2/2013 Chadwick, Jr. ....... G06F 12/123
711/122

\* cited by examiner

*Primary Examiner* — Denise Tran
(74) *Attorney, Agent, or Firm* — Nixon & Vanderhye P.C.

(57) ABSTRACT

A cache hierarchy and a method of operating the cache hierarchy are disclosed. The cache hierarchy comprises a first cache level comprising an instruction cache, and predecoding circuitry to perform a predecoding operation on instructions having a first encoding format retrieved from memory to generate predecoded instructions having a second encoding format for storage in the instruction cache. The cache hierarchy further comprises a second cache level comprising a cache and the first cache level instruction cache comprises cache control circuitry to control an eviction procedure for the instruction cache in which a predecoded instruction having the second encoding format which is evicted from the instruction cache is stored at the second cache level in the second encoding format. This enables the latency and power cost of the predecoding operation to be avoided when the predecoded instruction is then retrieved from the second cache level for storage in the first level instruction cache again.

12 Claims, 4 Drawing Sheets

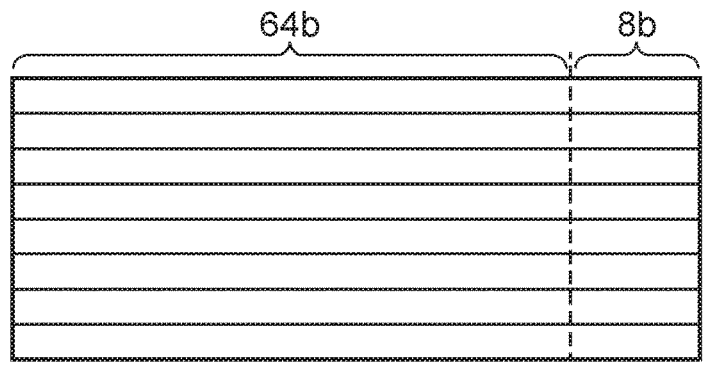
FIG. 2A
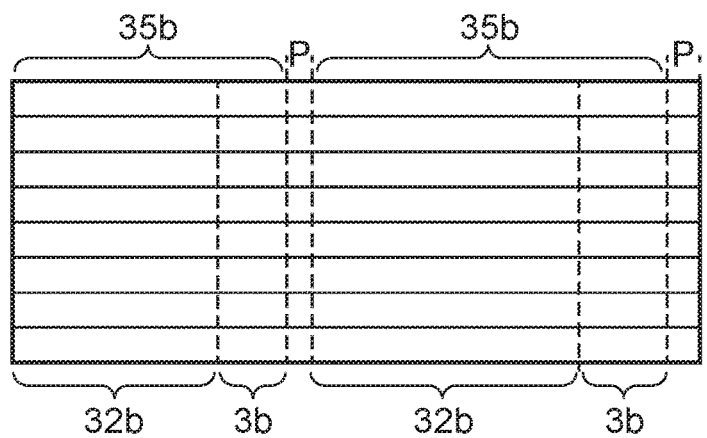
FIG. 2B
| CACHE LINE | | | | | | STATE |
|---|---|---|---|---|---|---|
| DATA | | | | ECC | | M |
| PREDECODED A32 INSTRUCTION | P | PREDECODED A32 INSTRUCTION | | | P | FØ |
| DATA | | | | ECC | | E |
| PREDECODED A64 INSTRUCTION | | | | | P | F1 |
| DATA | | | | ECC | | S |
| | | | | | | F3 |
| UN-PREDECODED INSTRUCTION(S) | | | | | | |
| PD T16 | PD T16 | P | PD T16 | PD T16 | P | F2 |
72b
FIG. 2C

CACHE HIERARCHY MANAGEMENT

TECHNICAL FIELD

The present disclosure relates to data processing. More particularly it relates to the management of a cache hierarchy in a data processing apparatus.

BACKGROUND

A data processing apparatus may be provided with at least one cache, so that the latency associated with retrieving data items from memory can largely be avoided for data items which are frequently accessed, by storing copies of these data items in the cache storage. Moreover, more than one level of cache may be provided, arranged as a cache hierarchy, wherein a smaller faster cache is provided closer to the processing circuitry which requires use of the data item copies, whilst a larger cache is provided further away, but which nonetheless allows faster access to the copies of data items it stores than accessing those original data items in the memory. Typically, these cache levels are referred to as level 1 and level 2 respectively. Furthermore, the usual arrangement is for the level 2 cache to store a subset of the data items available in the memory, whilst the level 1 cache stores a subset of the data items available in the level 2 cache. Nevertheless, instruction cache lines and data cache lines may be handled differently in regard to their storage in the cache hierarchy. For example, separate instruction and data caches may be provided at level 1, whilst a unified cache which stores both instruction lines and data lines may be provided at level 2. Furthermore, when a dedicated level 1 instruction cache is large enough for the instruction code working set of a typical user application to be captured entirely within the level 1 instruction cache, the cache hierarchy may be configured such that instruction cache lines are written directly into the level 1 instruction cache, bypassing the level 2 cache and preserving space therein for other purposes.

SUMMARY

At least one example described herein provides a cache hierarchy comprising: a first cache level comprising an instruction cache; predecoding circuitry to perform a predecoding operation on instructions having a first encoding format retrieved from memory to generate predecoded instructions having a second encoding format for storage in the instruction cache; and a second cache level comprising a cache, wherein the instruction cache comprises cache control circuitry to control an eviction procedure for the instruction cache in which a predecoded instruction having the second encoding format which is evicted from the instruction cache is stored at the second cache level in the second encoding format.

At least one example described herein provides a method of operating a cache hierarchy comprising: retrieving instructions having a first encoding format from memory; performing a predecoding operation on the instructions having the first encoding format to generate predecoded instructions having a second encoding format for storage in an instruction cache at a first cache level of the cache hierarchy; and controlling an eviction procedure for the instruction cache in which a predecoded instruction having the second encoding format which is evicted from the instruction cache is stored in a cache in the second encoding format at a second cache level of the cache hierarchy.

At least one example described herein provides a cache hierarchy comprising: means for retrieving instructions having a first encoding format from memory; means for performing a predecoding operation on the instructions having the first encoding format to generate predecoded instructions having a second encoding format for storage in an instruction cache at a first cache level of the cache hierarchy; and means for controlling an eviction procedure for the instruction cache in which a predecoded instruction having the second encoding format which is evicted from the instruction cache is stored in a cache in the second encoding format at a second cache level of the cache hierarchy.

BRIEF DESCRIPTION OF THE DRAWINGS

The present techniques will be described further, by way of example only, with reference to embodiments thereof as illustrated in the accompanying drawings, in which:

FIGS. 2A, 2B, and FIG. 2C illustrate a set of cache lines in a level 2 cache in one embodiment and a manner in which the instruction cache lines and data cache lines are stored in one embodiment;

DESCRIPTION OF EXAMPLE EMBODIMENTS

Figure 1:
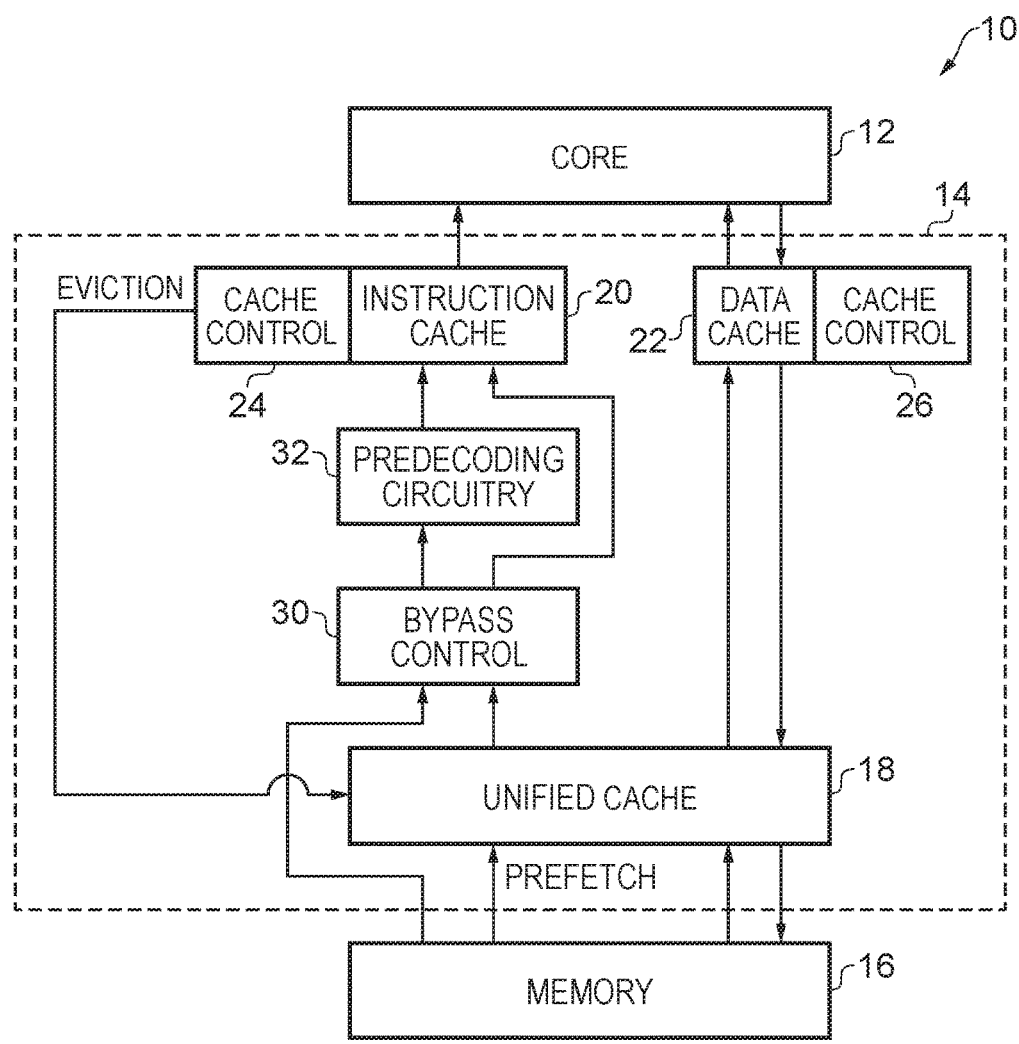
FIG. 1 schematically illustrates a data processing apparatus comprising a cache hierarchy in one embodiment.

In some example embodiments there is a cache hierarchy comprising: a first cache level comprising an instruction cache; predecoding circuitry to perform a predecoding operation on instructions having a first encoding format retrieved from memory to generate predecoded instructions having a second encoding format for storage in the instruction cache; and a second cache level comprising a cache, wherein the instruction cache comprises cache control circuitry to control an eviction procedure for the instruction cache in which a predecoded instruction having the second encoding format which is evicted from the instruction cache is stored at the second cache level in the second encoding format.

Accordingly the present techniques distinguish between instruction cache lines in dependence on their encoding format. Specifically, where the cache hierarchy comprises predecoding circuitry to perform a predecoding operation on instructions received from memory, the cache hierarchy distinguishes between the first encoding format in which instructions are originally retrieved from memory and a second encoding format resulting from the predecoding operation in which the instructions are stored in an instruction cache at the first level of the cache hierarchy. In particular, when a cache line is evicted from the level 1 instruction cache it is stored in the second level cache in the format into which it was modified by the predecoding operation, i.e. in the second encoding format. This approach recognises that whilst it may be beneficial for a dedicated instruction cache to be provided at the first cache level in which predecoded instructions are stored, the latency and power consumption associated with providing this predecoding functionality is non-trivial, and therefore level one instruction cache victims are kept in their predecoded format when evicted to the level 2 cache, such that when this instruction (or these instructions) in the corresponding cache line are needed again they can be directly read back from the level 2 cache into the level 1 instruction cache (if needed) and the predecode information is already fully available and no additional latency is incurred.

In some embodiments the cache hierarchy is responsive to arrival of an instruction having the first encoding format retrieved from memory to cause the instruction to bypass the second cache level for storage in the instruction cache of the first cache level. This "exclusive" approach preserves storage space in the second cache level and may for example be applied when the instruction cache at the first cache level has a size which is generally able to hold all of the instruction working set for typical applications running on the processing circuitry which the cache hierarchy supports. This allows the second level cache, even if unified (i.e. shared by data and instructions) to be used in the large part only for data caching.

In some embodiments the cache hierarchy further comprises bypass circuitry associated with the predecoding circuitry and responsive to arrival of an instruction in the second encoding format to cause the instruction in the second encoding format to bypass the predecoding circuitry and to be stored in the instruction cache. Accordingly, where an instruction is found to already be in the second encoding format, i.e. it has already been predecoded by the predecoding circuitry, stored in the instruction cache, and then evicted to the second cache level, the additional latency associated with the predecoding process can be saved by sending the instruction directly for storage in the instruction cache, without going via the predecoding circuitry.

The cache at the second cache level may take a variety of forms, and indeed may be variously configured with regard to its storage of instructions, but in some embodiments the cache at the second cache level is a unified cache to store instructions and data. The provision of a unified cache means that only one instance of cache control circuitry need be provided and moreover gives the second cache level flexibility with regard to the relative quantities of instructions and data which it can hold at any given time.

In some embodiments the second encoding format comprises additional bits with respect to the first encoding format, and the unified cache comprises storage entries with additional width accommodating the additional bits, wherein the additional width stores error correction code information when an entry in the unified cache is used to store data, and wherein the additional width stores the additional bits of the second encoding format when an entry in the unified cache is used to store an instruction. The additional bits (also referred to as "sideband bits" herein) which are generated by the predecoding processing need to be stored in the second cache level, such that the predecoded instruction, including these additional bits, can be passed directly to the instruction cache when required and therefore the benefit of avoiding a second iteration of the predecoding operation can be gained. When the second cache level is a unified cache which stores instructions and data, the present techniques propose that the additional storage which is required to store these additional bits can be purposed to store error correction code information for a cache line which is used to store data and to be used to store these additional (sideband) bits when the entry is used to store an instruction. Efficient usage of the storage space in the unified second level cache is therefore supported.

Accordingly, the present techniques recognise that the full extent of error correction code information which may be stored in association with data in the unified cache is generally not required for an instruction (which can always be refetched in the event that a corruption occurs) but nevertheless identification of such potential corruption can still be identified with only a limited amount of parity information. Hence in some embodiments the additional width stores a single parity bit indicative of parity of the entry when the entry in the unified cache is used to store the instruction.

The present techniques recognise that when a unified cache is provided at the second cache level a mechanism is required to identify whether a given cache line in the unified cache is populated with instructions or with data. The entries in the unified cache could be marked in a variety of ways to provide such identification, but in some embodiments the unified cache is arranged to participate in a cache coherency scheme, and the unified cache comprises storage entries each with an associated status field to store a status from a set of predefined statuses for the cache coherency scheme, and, when an entry in the unified cache is used to store an instruction, the associated status field stores a further status, wherein the further status is not part of the set of predefined statuses for the cache coherency scheme. For example, the set of predefined statuses for the cache coherency scheme could be the set referred to as "MESI", i.e. modified, exclusive, shared, or invalid. Where these are cache coherency states which are applicable to data entries, the present techniques propose an additional status which may be stored in the same status field, this further status not being part of the cache coherency scheme and being used to indicate that this entry is an instruction. In some embodiments described herein this further status is referred to as "F", as an abbreviation for "fetch", indicating the fact that this entry is an instruction.

In some embodiments the first cache level comprises a data cache, and wherein the unified cache is responsive to a cache lookup initiated by the data cache, which queries the entry in the unified cache where the associated status field stores the further status to generate a cache miss signal. Thus, when a data request misses in the level 1 data cache and a look up in the level 2 unified cache is initiated, an entry in the unified cache (which would otherwise match i.e. based on its tag) will be caused to generate a cache miss signal if it is marked as storing instructions by its status field content, since predecoded instruction data stored in the unified cache cannot be read into the level 1 data cache, in particular because the expanded format of the predecoded instruction no longer matches the standard data word length expected for a cached data item.

Whilst the further status stored in the status field of the unified cache could be variously configured, for example merely indicating that this is a cache line storing instruction data, the present techniques further contemplate that further information could be stored in association with this further status and in some embodiments the further status is indicative of an instruction set according to which the predecoding operation for the instruction stored in the entry was performed. Hence, where the predecoding process applied to an instruction may vary in dependence on the instruction set for which the predecoding operation is carried out, the relevant instruction set may be indicated by different permutations of the further status. For example, where the data processing apparatus of which the cache hierarchy forms part is arranged to execute instructions belonging to one of the 64-bit instruction sets, the 32-bit instruction sets, or the 16-bit "Thumb" instruction sets provided by ARM® Limited of Cambridge, UK, the further status may indicate which of these three types of instruction set the precoding was performed for.

Accordingly, in some embodiments the unified cache is responsive to a cache lookup initiated by the instruction cache which queries the entry in the unified cache where the associated status field stores the further status, to require a match for the instruction set according to which the precoding operation for the instruction stored in the entry was performed in order to generate a cache hit signal. This enables the processing apparatus to switch between instruction sets without needing to flush instruction data content from the second cache level to ensure that predecoded instructions for one instruction set are not retrieved into the first level instruction cache by a process executing a different instruction set.

In some embodiments the further status is indicative of an un-predecoded instruction when the entry in the unified cache is used to store a prefetched instruction which was caused to be stored in the entry before being requested by a processing device arranged to execute the instructions. Accordingly, whilst generally the approach presented by the present techniques is for instructions retrieved from memory to bypass the second level cache initially and only to be stored there once evicted from the instruction cache in an already predecoded format, it is nevertheless further contemplated that provision could be made for instructions to be prefetched to the second level cache from memory and therefore stored therein an un-predecoded format (i.e. the first encoding format) and the further status stored in association with an entry in the second level cache can be extended to indicate such un-predecoded instructions. The bypass control of the cache hierarchy will therefore cause these entries to be predecoded in the predecoding circuitry en route to the instruction cache.

At least some example embodiments described herein provide a method of operating a cache hierarchy comprising: retrieving instructions having a first encoding format from memory; performing a predecoding operation on the instructions having the first encoding format to generate predecoded instructions having a second encoding format for storage in an instruction cache at a first cache level of the cache hierarchy; and controlling an eviction procedure for the instruction cache in which a predecoded instruction having the second encoding format which is evicted from the instruction cache is stored in a cache in the second encoding format at a second cache level of the cache hierarchy.

At least some embodiments described herein provide a cache hierarchy comprising: means for retrieving instructions having a first encoding format from memory; means for performing a predecoding operation on the instructions having the first encoding format to generate predecoded instructions having a second encoding format for storage in an instruction cache at a first cache level of the cache hierarchy; and means for controlling an eviction procedure for the instruction cache in which a predecoded instruction having the second encoding format which is evicted from the instruction cache is stored in a cache in the second encoding format at a second cache level of the cache hierarchy.

Some particular embodiments will now be described with reference to the figures. FIG. 1 schematically illustrates a data processing apparatus 10 comprising a processor core 12, a cache hierarchy 14, and a memory 16. The processor core 12 performs data processing operations in response to instructions, where those instructions are retrieved from storage in the memory 16. Furthermore, the instructions cause the processor core 12 to perform the data processing operations on data items also retrieved from the memory 16. In a manner with which one of ordinary skill in the art will in a general sense be familiar, a cache hierarchy is provided, such that the latency associated with the retrieval of instructions or data from the memory 16 can be reduced when those instructions or data are frequently accessed, by storing them in a cache level for which the access latency is lower. The cache hierarchy 14 is shown in FIG. 1 to comprise a unified cache 18 (level 2) and separate instruction and data caches 20 and 22 respectively at level 1. Each is provided with its own associated cache control circuitry 24 and 26 respectively. The arrows in FIG. 1 schematically illustrate the general flow of items between the illustrated components. On the right hand side a simpler pattern of flow is shown for data items which, when retrieved from memory 16 are cached in the unified cache 18, are cached in the level 1 data cache 22, and passed to the processor core 12 to be subjected to data processing. Modified data items are written back to the level 1 data cache 22, to the unified cache 18, and ultimately back to the memory 16.

Conversely, the left hand side of FIG. 1 illustrates that generally when an instruction is received from memory it bypasses the unified cache 18 and is first handled by the bypass control 30. The bypass control 30 identifies instructions which have not yet been predecoded and passes these to the predecoding circuitry 32. Having been subjected to the predecoding process these instructions are written into the instruction cache 20 for access by the processor core 12. The manner in which new content is added to a cache, by selection of a victim cache line to replace, by allocation of the new cache line, and so on, are not described here for brevity. When an entry in the instruction cache 20 is evicted (under the control of the cache control circuitry 24) it is evicted to the unified cache 18. Thereafter if a request for this instruction (i.e. a reference to the memory address at which it is stored) hits in the unified cache (as will be described in more detail with respect to the figures that follow) the bypass control 30 identifies that this instruction is already in the predecoded format and causes it to bypass the predecoding circuitry 32 and to return directly to the instruction cache 20, thus avoiding the latency associated with the predecoding processing. Note that FIG. 1 also illustrates an exception to the general rule of instructions retrieved from memory initially bypassing the unified cache 18, namely the arrow labelled "prefetch" indicating that in some implementations a prefetch mechanism may be provided in order to prepopulate the unified cache 18 with instructions which are expected to be required, but have not yet been requested. These un-predecoded instructions are therefore distinguished in the unified cache 18 from those in the predecoded format resulting from an eviction from the instruction cache 20, as is described further with reference to the figures that follow. Finally note that although the level 2 cache is shown in the example of FIG. 2 as being unified (combined instruction and data) cache, in a variant separate instruction and data caches could also be provided at level 2.

FIGS. 2A, 2B and 2C illustrate the manner in which the cache lines stored within the second level (unified) cache are used to store information in some embodiments. In the illustrated example the data word size in the system is 32-bit and FIG. 2A illustrates that a given cache line can store two 32-bit words and comprises a further 8 bits of storage in association with each cache line. When the cache line is used to store data the additional 8 bits are used to store error correction code (ECC) information, i.e. 8 bits of ECC for each 64 bits of data. FIG. 2B illustrates how the same storage space may be used to store predecoded instructions, wherein an un-predecoded 32-bit instruction becomes a 35-bit predecoded instruction, i.e. wherein 3 bits (sideband bits) are created during the predecode process. Additionally, a single parity bit is stored in association with each predecoded instruction to maintain the soft error rate (SER) protection. It should be appreciated that the ordering of the subdivision of each cache line shown in FIG. 2B (i.e. 32$b$, 3$b$, P, 32$b$, 3$b$, P) is arbitrary and for clarity of illustration, and could be otherwise configured, e.g. as shown in FIG. 2A with 64 bits of data followed by 8 bits of ECC.

Now referring to FIG. 2C, the example content of the cache lines shown (and noting that in all of FIG. 2A to 2C for simplicity of illustration only eight cache lines are shown, but a level 2 cache would typically have many more lines than this). In addition to the 72-bit width discussed above with reference to FIGS. 2A and 2B, FIG. 2C additionally illustrates that a status field is associated with each cache line. The state stored in this status field is used to indicate the cache coherency status (MESI) when the cache line stores data and examples are shown in FIG. 2C of 64-bit width data, 8-bit width ECC, and cache coherency states of M, E, and S. Conversely, when a cache line is used to store instruction data the status field is populated with an F status, which as can be seen in FIG. 2C are further subdivided in this example into four categories namely F0, F1, F2, and F3. These respective "fetch" states all indicating that the cache line contains instruction data further individually indicate in cases of F0-F2 the instruction set for which the predecoding process for the predecoded instruction was carried out. Accordingly, in the example of FIG. 2C F0 corresponds to the 32-bit instruction set, F1 corresponds to the 64-bit instruction set, and F2 corresponds to the 16-bit "Thumb" instruction set. The status F3 is used to label instructions which are not predecoded but have been brought into the level 2 cache by a prefetch process. As was described with reference to FIG. 2B, each of the predecoded instructions is provided with a parity bit with respect to each set of 35-bits of predecoded instruction data. It will be appreciated that the particular bit locations at which this parity data is stored in association with the predecoded instructions is not significant.

Figure 3:
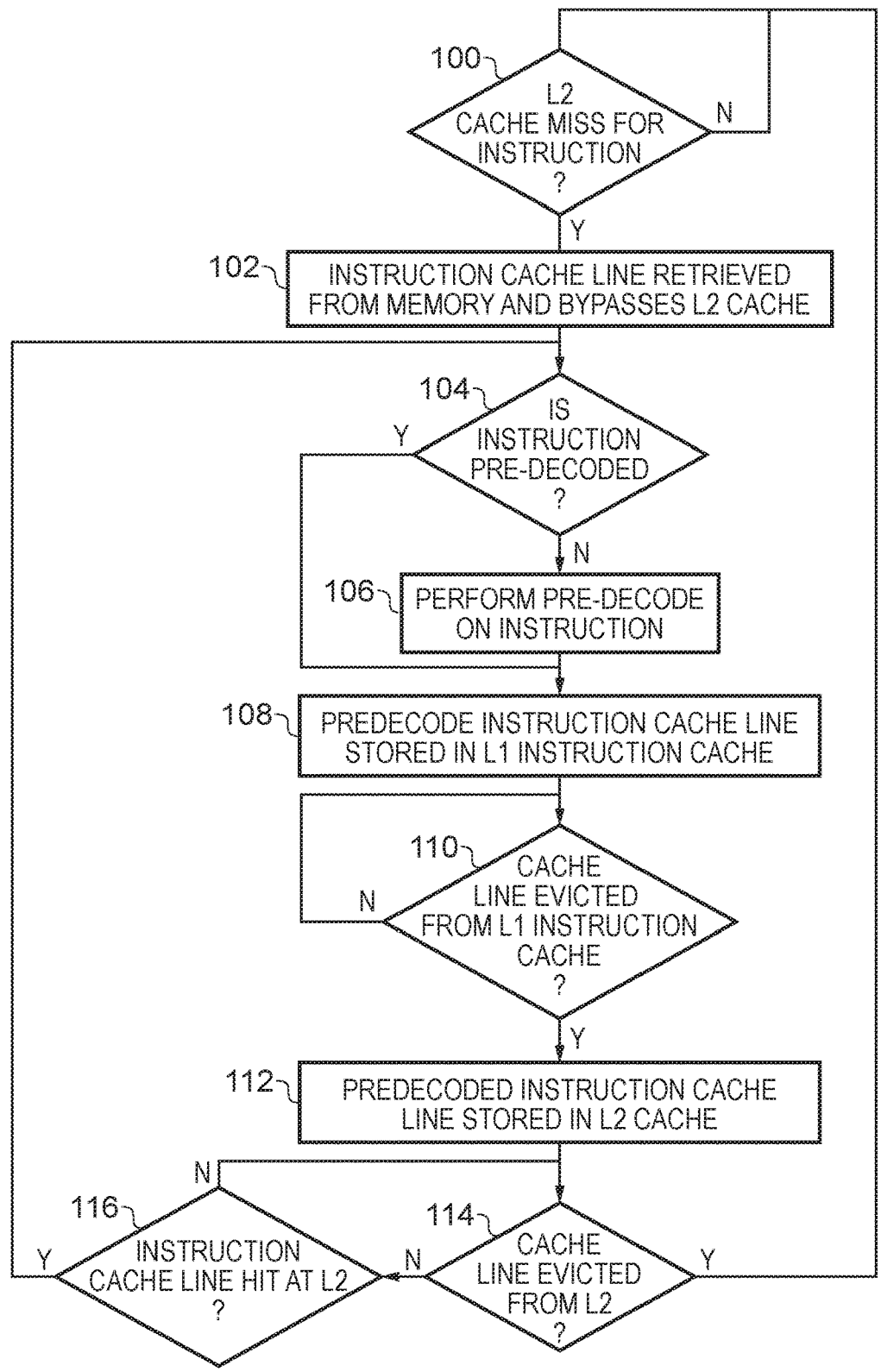
FIG. 3 shows a sequence of steps which are taken according to the method of one embodiment, which demonstrates the "lifecycle" of an instruction cache line in one embodiment.

FIG. 3 shows a sequence of steps which are taken according to the method of one embodiment when an instruction cache line is retrieved from memory and brought into the cache hierarchy. The flow can be considered to begin at step 100 where a level 2 cache miss for an instruction occurs. The flow then proceeds to step 102 where the instruction cache line is retrieved from memory, brought into the cache hierarchy, and bypasses the level 2 cache. Then at step 104 (in the bypass circuitry) it is determined if the instruction is predecoded. When arriving at this step coming from step 102 this will not be true and at step 106 the instruction is predecoded. Then at step 108 the predecoded instruction cache line is stored in the level 1 instruction cache. The cache line then remains there for access by the processor core until it is evicted. In other words, at step 110, the flow loops on itself until the cache line is evicted. Then on eviction, at step 112 the predecoded instruction cache line is stored in the level 2 cache, where it will remain until evicted. At step 114 it is determined if the cache line has been evicted from the level 2 cache and when this is true the flow returns to step 100. Otherwise the flow proceeds to step 116, where it is determined if this instruction cache line has been hit by a look up at level 2. Whilst this is not the case, the flow loops back to step 114. However, when the instruction cache line is hit in a look up at level 2 the flow returns to step 104 and at this iteration it will be determined that the instruction has already been predecoded and the flow bypasses step 106 proceeding directly to step 108 for the predecoded instruction cache line to be stored in the L1 instruction cache again.

Figure 4:
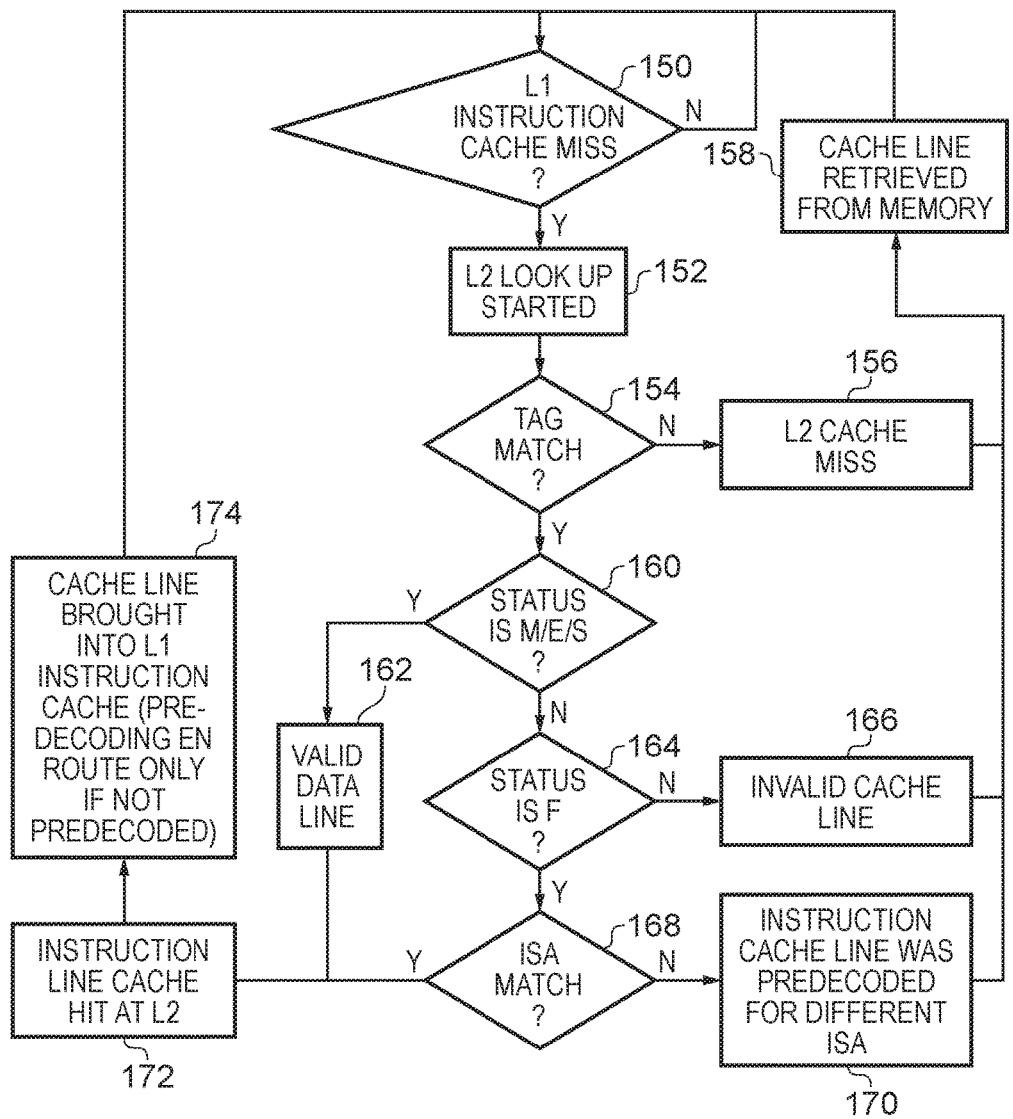
FIG. 4 shows a sequence of steps which are taken according to the method of one embodiment when a level 1 instruction cache miss occurs and a level 2 cache lookup is carried out.

FIG. 4 shows a sequence of steps which are taken according to the method of one embodiment when there is a level 1 instruction cache miss and a level 2 look up procedure is carried out. Accordingly, the flow can be considered to begin at step 150 where the flow loops until such a level 1 instruction cache miss occurs. The flow then proceeds to step 152 and the level 2 lookup is started. It is firstly determined at step 154 whether there is a tag match and if this is not the case then a level 2 cache miss is the result (step 156) and the flow proceeds to step 158 at which the required cache line is caused to be retrieved from memory. If however at step 154 there is a tag match then the status of the matching cache line is examined at step 160 to determine if it is M, E, or S. This being the case the flow proceeds to step 162 since this is a valid data line and hits on such "data" cache lines are treated like instruction cache hits that do not have predecode information (i.e. those that are labelled "F3"). From step 162 the flow proceeds to step 172 (see description below). If however at step 160 it is determined that the status is not M, E, or S, then at step 164 it is determined if the status is F (i.e. one of the F status F0-F3). If it is not, then this is an invalid cache line (step 166) and the flow returns to step 158 for the cache line to be retrieved from memory. If however the status of the cache line is F, then it is determined at step 168 if there is an instruction set match, i.e. if the instruction set requesting this instruction matches that for which the predecoding of this instruction was performed as indicated by the particular type of F state (F0-F2) stored in association with the cache line. If there is no match then (step 170) the instruction cache line was predecoded for a different ISA and the flow returns to step 158 for the cache line to be retrieved from memory. However, on an ISA match at step 168 the flow proceeds to step 172. Note that the F state F3 is treated as a special case at step 168, where a cache line labelled as F3, i.e. containing unpredecoded instruction data, will result in an "ISA match" for any requesting process regardless of its instruction set. Step 172 represents an instruction line cache hit at level 2 (although noting that a hit on a data line in one of the M, E, or S states will also arrive here via steps 160 and 162) and at step 174 the cache line is brought into the level 1 instruction cache, only being predecoded en route if it was not already predecoded. This should be noted generally not to be expected to be the case unless it is a prefetched unpredecoded instruction or a hit on a data line (which of course should not be processed by the predecoding circuitry).

In brief overall summary a cache hierarchy and a method of operating the cache hierarchy are disclosed. The cache hierarchy comprises a first cache level comprising an instruction cache, and predecoding circuitry to perform a predecoding operation on instructions having a first encoding format retrieved from memory to generate predecoded instructions having a second encoding format for storage in the instruction cache. The cache hierarchy further comprises a second cache level comprising a cache and the first cache level instruction cache comprises cache control circuitry to control an eviction procedure for the instruction cache in which a predecoded instruction having the second encoding format which is evicted from the instruction cache is stored at the second cache level in the second encoding format. This enables the latency and power cost of the predecoding operation to be avoided when the predecoded instruction is then retrieved from the second cache level for storage in the first level instruction cache again.

In the present application, the words "configured to . . . " or "arranged to" are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" or "arranged to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

We claim:

1. A cache hierarchy comprising:
a first cache level comprising an instruction cache;
predecoding circuitry to perform a predecoding operation on instructions having a first encoding format retrieved from memory to generate predecoded instructions having a second encoding format for storage in the instruction cache;
a second cache level comprising a cache; and
bypass circuitry associated with the predecoding circuitry and responsive to arrival of an instruction in the second encoding format to cause the instruction in the second encoding format to bypass the predecoding circuitry and to be stored in the instruction cache,
wherein the instruction cache comprises cache control circuitry to control an eviction procedure for the instruction cache in which a predecoded instruction having the second encoding format which is evicted from the instruction cache is stored at the second cache level in the second encoding format.

2. The cache hierarchy as claimed in claim 1, wherein the cache hierarchy is responsive to arrival of an instruction having the first encoding format retrieved from memory to cause the instruction to bypass the second cache level for storage in the instruction cache of the first cache level.

3. The cache hierarchy as claimed in claim 1, wherein the cache at the second cache level is a unified cache to store instructions and data.

4. The cache hierarchy as claimed in claim 3, wherein the second encoding format comprises additional bits with respect to the first encoding format, and the unified cache comprises storage entries with additional width accommodating the additional bits,
wherein the additional width stores error correction code information when an entry in the unified cache is used to store data, and
wherein the additional width stores the additional bits of the second encoding format when an entry in the unified cache is used to store an instruction.

5. The cache hierarchy as claimed in claim 4, wherein the additional width stores a single parity bit indicative of parity of the entry when the entry in the unified cache is used to store the instruction.

6. The cache hierarchy as claimed in claim 3, wherein the unified cache is arranged to participate in a cache coherency scheme, and the unified cache comprises storage entries each with an associated status field to store a status from a set of predefined statuses for the cache coherency scheme,
and, when an entry in the unified cache is used to store an instruction, the associated status field stores a further status, wherein the further status is not part of the set of predefined statuses for the cache coherency scheme.

7. The cache hierarchy as claimed in claim 6, wherein the first cache level comprises a data cache, and wherein the unified cache is responsive to a cache lookup initiated by the data cache, which queries the entry in the unified cache where the associated status field stores the further status to generate a cache miss signal.

8. The cache hierarchy as claimed in claim 6, wherein the further status is indicative of an instruction set according to which the predecoding operation for the instruction stored in the entry was performed.

9. The cache hierarchy as claimed in claim 8, wherein the unified cache is responsive to a cache lookup initiated by the instruction cache which queries the entry in the unified cache where the associated status field stores the further status, to require a match for the instruction set according to which the predecoding operation for the instruction stored in the entry was performed in order to generate a cache hit signal.

10. The cache hierarchy as claimed in claim 6, wherein the further status is indicative of an un-predecoded instruction when the entry in the unified cache is used to store a prefetched instruction which was caused to be stored in the entry before being requested by a processing device arranged to execute the instructions.

11. A method of operating a cache hierarchy comprising:
retrieving instructions having a first encoding format from memory;
performing a predecoding operation on the instructions having the first encoding format to generate predecoded instructions having a second encoding format for storage in an instruction cache at a first cache level of the cache hierarchy;
in response to arrival of an instruction in the second encoding format, causing the instruction in the second encoding format to bypass predecoding circuitry that performs the predecoding operation and to be stored in the instruction cache; and
controlling an eviction procedure for the instruction cache in which a predecoded instruction having the second encoding format which is evicted from the instruction cache is stored in a cache in the second encoding format at a second cache level of the cache hierarchy.

12. A cache hierarchy comprising:
means for retrieving instructions having a first encoding format from memory;
means for performing a predecoding operation on the instructions having the first encoding format to generate predecoded instructions having a second encoding format for storage in an instruction cache at a first cache level of the cache hierarchy;
means, associated with the means for performing and responsive to arrival of an instruction in the second encoding format, for bypassing the means for performing the decoding operation and to be stored in the instruction cache; and means for controlling an eviction procedure for the instruction cache in which a predecoded instruction having the second encoding format which is evicted from the instruction cache is stored in a cache in the second encoding format at a second cache level of the cache hierarchy.

\* \* \* \* \*